Patented May 24, 1932

1,859,740

UNITED STATES PATENT OFFICE

DANIEL JOSEPH KENNEDY, OF VANCOUVER, BRITISH COLUMBIA, CANADA

TREATMENT OF COFFEE

No Drawing.      Application filed May 28, 1930. Serial No. 456,819.

My invention relates to improvements in the treatment of coffee the objects of which are to render it particularly beneficial as a beverage and more nutritious than coffee in its accepted form. Further objects are to combine it with cocoa or chocolate and to so treat it that the caffeine is neutralized and combined with the theobromine of the cocoa, which is in effect a blending of these components, imparting an aroma and flavour to the beverage which is highly desirable.

The present process contemplates the subjection of the coffee and the cocoa to ultra violet rays preferably derived from the tungsten arc lamp, though similar rays from the quartz mercury vapour or other arc lamps and devices produce similar results.

The invention consists essentially of subjecting the coffee to ultra violet rays to neutralize its caffeine and convert it to a nutritious state and coating the treated coffee with chocolate and subjecting the resultant mixture to a further treatment of said rays.

I take the green coffee berries and pass them under a tungsten arc lamp, subjecting them to its rays for a period of approximately 15 seconds or such other period as to enable the rays to penetrate to the innermost tissues of the berry, and by so doing neutralize the caffeine and causing an intermingling of the caffeine with the proteins, oils and other protective substances such as the magnesium and calcium salts.

The coffee is then roasted by any suitable process, during which the starch content is dextrinized and the sugar content is caramelized.

Before the completion of the roasting process and while the berries are expanding, the coffee is coated with freshly and finely ground cocoa nibs, particles of which enter the opened pores of the coffee and become fastened therein as the coffee contracts on cooling, effectively sealing the pores against the escape of volatile oils in the coffee and preventing the escape of its occluded gases such as carbon dioxide.

If the final roasting is done by the heat from an electric arc the ozone evolved from the arc permeates the cell structure and appears to increase the oxygen content of the finished coffee and cocoa.

Immediately following the completion of the roasting the material is withdrawn from the roaster and it is subjected to the rays of a mercury vapour lamp for from ten to twenty seconds, which causes a substantially complete blending of the neutralized caffeine and the theobromine of the cocoa creating a vital energy and developing and multiplying vitamines D and E.

The vitamin energies of the blended caffeine and theobromine are absolutely set free in the finished cup of coffee, hence the physiological behaviour of the true food or nutritional coffee can be readily tested out and actually measured and the findings on recheck will be very clear and as follows: Multiplying the vitamins D and E in the coffee and cocoa constituents i. e. caffeine, theobromine, phosphate and carbonate of potash, proteins, etc.

This processed coffee is remarkable for its vital energy and is possessed of great power for stimulating to greater efficiency the proteiolytic and diastetic ferments setting in motion that long chain of cleavage processes in the various foodstuffs, assisting in their absorbtion, assimilation and ultimate transmutation into living protoplasm. In other words it speeds up the body's metabolism so that the food materials may be incorporated into the system, increasing the power to do muscular work, increases power of concentration of mental effort and therefore quickens the perceptions and enhances the power to sustained intellectual work with no undesirable after effects. All normal individuals using this coffee regularly will quite uniformly show an improvement in general health, spirits, natural sleep and general efficiency and it positively does not draw on the physical reserves of the body at any time.

What I claim as my invention is:

1. The process of treating coffee which consists of subjecting the green berries to ultra violet rays until the caffeine is neutralized, of roasting the coffee and of coating the roasted coffee while in a heated condition with cocoa.

2. The process of treating coffee which consists of subjecting the green berries to ultra violet rays until the caffeine is neutralized, of partially roasting the coffee and coating it with cocoa and of completing the roasting process by direct heat from an electric arc.

3. The process of treating coffee which consists of subjecting the green berries to ultra violet rays until the caffeine is neutralized, of roasting the coffee and coating it with cocoa and of subjecting the whole to the rays from a mercury vapor lamp whereby the neutralized caffeine and theobromine of the cocoa are blended.

Dated at Vancouver, B. C., this 29th day of April, 1930.

DANIEL JOSEPH KENNEDY.